United States Patent
Bates et al.

(10) Patent No.: US 9,668,026 B2
(45) Date of Patent: May 30, 2017

(54) AUDIO CONTENT PLAYBACK MANAGEMENT

(71) Applicant: Sonos, Inc., Santa Barbara, CA (US)

(72) Inventors: Paul Andrew Bates, Santa Barbara, CA (US); Abhishek Kumar, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 14/729,331

(22) Filed: Jun. 3, 2015

(65) Prior Publication Data

US 2015/0271227 A1   Sep. 24, 2015

Related U.S. Application Data

(63) Continuation of application No. 13/630,027, filed on Sep. 28, 2012, now Pat. No. 9,078,010.

(51) Int. Cl.
*G06F 17/00* (2006.01)
*H04N 21/482* (2011.01)
(Continued)

(52) U.S. Cl.
CPC ....... *H04N 21/4825* (2013.01); *G11B 27/031* (2013.01); *H04L 49/90* (2013.01);
(Continued)

(58) Field of Classification Search
CPC ........... H04N 21/4825; H04N 21/4622; H04N 21/4383; H04N 21/458; G06F 17/30053; G06F 17/30772
See application file for complete search history.

(56) References Cited

U.S. PATENT DOCUMENTS 5,440,644 A    8/1995 Farinelli et al.
5,761,320 A    6/1998 Farinelli et al.
(Continued)

FOREIGN PATENT DOCUMENTS

EP    1389853 A1    2/2004
WO    0153994       7/2001
WO    0393950 A2   11/2003

OTHER PUBLICATIONS

"AudioTron Quick Start Guide, Version 1.0", Voyetra Turtle Beach, Inc., Mar. 2001, 24 pages.
(Continued)

*Primary Examiner* — Andrew C Flanders
(74) *Attorney, Agent, or Firm* — McDonnell Boehnen Hulbert & Berghoff LLP

(57) ABSTRACT

An example implementation involves a playback device receiving a request to add continuous automated streaming audio content to a playback queue, the request indicating a playback start time, and the playback queue indicating a plurality of audio content. The implementation further involves the playback device adding the continuous automated streaming audio content to the playback queue. The example implementation also involves the playback device determining that a duration until the playback start time is less than a duration of the given audio content before playing a given audio content in the playback queue. The example implementation involves the playback device responsively, playing the continuous automated streaming audio content.

20 Claims, 14 Drawing Sheets

(51) Int. Cl.
*H04N 21/00* (2011.01)
*H04N 21/439* (2011.01)
*G11B 27/031* (2006.01)
*H04L 12/861* (2013.01)
*H04L 29/06* (2006.01)

(52) U.S. Cl.
CPC ........ *H04L 65/4092* (2013.01); *H04N 21/00* (2013.01); *H04N 21/439* (2013.01)

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,255,961 B1 | 7/2001 | Van Ryzin et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,020,048 B2 | 3/2006 | McComas |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,827,259 B2 | 11/2010 | Heller et al. |
| 7,853,341 B2 | 12/2010 | McCarty et al. |
| 7,958,441 B2 | 6/2011 | Heller et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,223,975 B2 | 7/2012 | Marko |
| 8,234,395 B2 | 7/2012 | Millington |
| 8,483,853 B1 | 7/2013 | Lambourne |
| 8,818,538 B2 | 8/2014 | Sakata |
| 9,078,010 B2 * | 7/2015 | Bates ............... H04N 21/00 |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0049974 A1 | 4/2002 | Shnier |
| 2002/0124097 A1 | 9/2002 | Isely et al. |
| 2003/0014767 A1 | 1/2003 | Stumphauzer et al. |
| 2003/0157951 A1 | 8/2003 | Hasty |
| 2004/0024478 A1 | 2/2004 | Hans et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0261040 A1 | 12/2004 | Radcliffe et al. |
| 2006/0059535 A1 | 3/2006 | D'Avello |
| 2006/0168340 A1 | 7/2006 | Heller et al. |
| 2007/0123185 A1 | 5/2007 | Welk et al. |
| 2007/0142944 A1 | 6/2007 | Goldberg et al. |
| 2007/0256100 A1 | 11/2007 | Jeong |
| 2009/0320075 A1 | 12/2009 | Marko |
| 2013/0254207 A1 | 9/2013 | Coburn, IV et al. |

OTHER PUBLICATIONS

"AudioTron Reference Manual, Version 3.0", Voyetra Turtle Beache, Inc., May 2002, 70 pages.
"AudioTron Setup Guide, Version 3.0", Voyetra Turtle Beach, Inc., May 2002, 38 pages.
"Blueteooth. "Specification of the Bluetooth System: The ad hoc SCATTERNET for affordable highly fuctional wireless connectivity" Core, Version 1.0 A, Jul. 26, 1999, 1068 pages".
"Bluetooth. "Specification of the Bluetooth System: Wireless connectiosn made easy" Core, Version 1.0 B, Dec. 1, 1999, 1076 pages".
Co-pending US patent application No. US200460577450, filed on Jun. 5, 2004.
"Dell, Inc. "Dell Digital Audio Receiver: Reference Guide" Jun. 2000, 70 pages".
"Dell, Inc. "Start Here" Jun. 2000, 2 pages".
Jo J., et al., "Synchronized One-to-many Media Streaming with Adaptive Playout Control," Proceedings of SPIE, 2002, vol. 4861, pp. 71-82.
"Jones, Stephen. "Dell Digital Audio Receiver: Digital upgrade for your analog stereo" Analog Stereo. Jun. 24, 2000 retrieved Jun. 18, 2014, 2 pages".
"Louderback, Jim. "Affordable Audio Receiver Furnishes Homes With MP3" TechTV Vault. Jun. 28, 2000 retrieved Jul. 10, 2014, 2 pages".
"Non-Final Office Action mailed on Oct. 24, 2014, issued in connection with U.S. Appl. No. 13/630,027, filed Sep. 28, 2012, 15 pages.".
"Notice of Allowance mailed on Mar. 9, 2015, issued in connection with U.S. Appl. No. 13/630,027, filed Sep. 28, 2012, 5 pages.".
"Palm, Inc. "Handbook for the Palm VII Handheld" May 2000, 311 pages".
"Presentations at WinHEC 2000" May 2000, 138 pages.
PRISMIQ; Inc., "PRISMIQ Media Player User Guide", 2003, 44 pages.
"UPnP; "Universal Plug and Play Device Architecture"; Jun. 8, 2000; version 1.0; Microsoft Corporation; pp. 1-54".
"Denon 2003-2004 Product Catalog," Denon, 2003-2004, 44 pages.
United States Patent and Trademark Office, U.S. Appl. No. 60/490,768 filed on Jul. 28, 2003, entitled "Method for synchronizing audio playback between multiple networked devices," 13 pages.
United States Patent and Trademark Office, U.S. Appl. No. 60/825,407 filed on Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

AUDIO CONTENT PLAYBACK MANAGEMENT

CROSS-REFERENCE TO RELATED APPLICATIONS

This application is a continuation of U.S. patent application Ser. No. 13/630,027, filed on Sep. 28, 2012, entitled "Audio Content Playback Management," which is incorporated herein by reference in its entirety.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
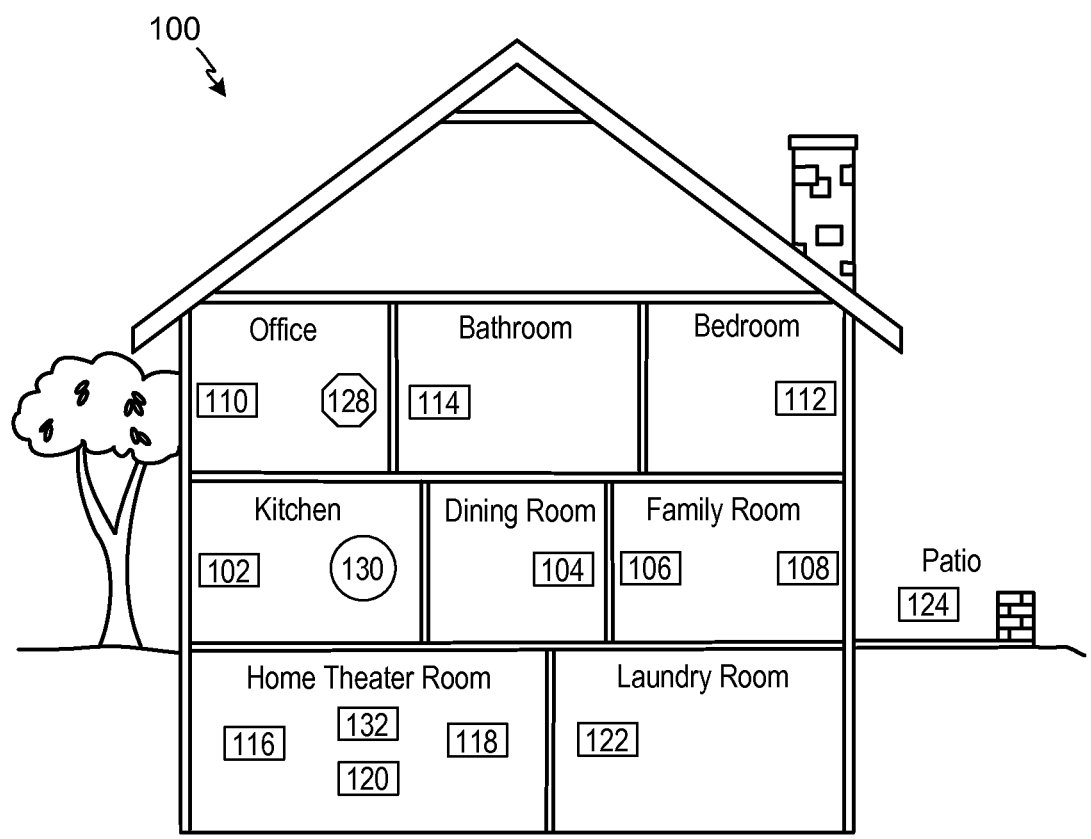
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Listening to audio content out loud can be a social activity that involves family, friends, or both. Audio content may include, for instance, music, talk radio, books, audio from television, and other audible material. For example, in a household, people may play music out loud at parties and other social gatherings. In such an environment, people may wish to play the music in one listening zone or multiple listening zones simultaneously, such that the music in each listening zone may be synchronized, without audible echoes or glitches. Listening to audio content out loud can also be an individual experience. For example, an individual may play music out loud for themselves in the morning before work, in the evening during dinner, or at other times throughout the day at home, work, or on the road. For these individual experiences, the individual may choose to either use headphones or limit the out loud playback of audio content to a single zone or area.

In an example, an audio system may include one or more audio players, often referred to herein as zone players or playback devices or players, and controllers, which may also be a player in some instances. A controller may be used to control the playback system, and can include capabilities for, among other things, browsing and selecting audio content for playback, viewing and editing audio content in one or more playback queues, or grouping and ungrouping zone players into one or more listening zones, etc. According to an embodiment, the playback system may operate as a distributed system such that each controller has full control over the entire playback system, and each player has the ability to play audio content from the either a same audio source or a different audio source as another player.

In some occasions, the listening experience may be enriched when people browse audio sources, add music to a playback queue, learn more about the music (such as track title or track artists), or view what music is next in the playback queue. A playback queue may represent a queue of audio content, or pointers to audio content, to be played, and may be saved as a playlist to be recalled at a later time.

In the present application, methods and systems are provided for creating a playlist using a variety of audio content including, among other items, a mix of songs, podcasts, radio stations, radio programs, or other audible items. In one case, the playlist may include audio content with an implicit playback duration such as, for example, a track length of an audio track. In this case, playback of the audio content will naturally stop after a finite amount of time. The playlist may further include audio content without the implicit duration such as, for example, streaming radio stations. In this case, the audio content may play indefinitely until explicitly stopped.

In the following discussions, streaming audio content refers to audio content for which the content data is received from a remote server, as the audio content is being played back. This may include audio content played back via music streaming services such as SPOTIFY™, RHAPSODY®, PANDORA™, NPR, and so on. In one case, such as that of SPOTIFY™ or RHAPSODY®, for example, a user may select specific tracks (with an implicit duration) to add to a playlist, and the selected track may be played back for the length of the track at a corresponding position in the playlist.

In another case, such as that of PANDORA™, NPR, and aspects of SPOTIFY™ and RHAPSODY®, for example, the user may select a streaming service, and subsequently, content provided by the streaming service may be played back indefinitely until explicitly stopped. In this case, while the user may select the streaming service and/or channel, the specific content provided by the streaming service may be automatically determined by the streaming service, and not the user. In the following discussions, audio content that may be played indefinitely, with specific content determined by a streaming service is referred to as automated streaming audio content.

In the instance of PANDORA™, the user may select a "channel" based on genre or artist, for example, and the streaming service may automatically determine individual tracks to be played, based on the selected channel. In other words, the automated streaming audio content may include a compilation of discrete audio content determined by the streaming service automatically according to the channel. In the following discussions, automated streaming audio content having discrete audio content may be referred to as discrete automated streaming audio content. In one case, each of the discrete audio content in the discrete automated streaming audio content may have respective implicit durations.

In the instance of NPR or other traditional, live radio stations, the user may select the radio station to be played back, and the streaming service may simply provide a stream of the live content of the radio station (as available over traditional radio frequencies). In other words, the automated streaming audio content may simply be a continuous stream of content provided as the live radio continues. In the following discussions, automated streaming audio content which includes a continuous stream of content may be referred to as a continuous automated streaming audio content.

In one aspect, a method for adding and rendering automated streaming audio content in a playback queue is provided. The method involves receiving a request to add automated streaming audio content to a particular playback position in a playback queue. The playback queue indicates a plurality of audio content and a corresponding playback position associated with each of the plurality of audio content. The method further involves determining a playback duration for the automated streaming audio content, adding the automated streaming audio content to the playback queue at the particular playback position, and causing the automated streaming audio content to be rendered at the particular playback position in the playback queue for the determined playback duration.

In another aspect, a system for adding and rendering automated streaming audio content in a playback queue is provided. The system includes at least one processor, a non-transitory computer readable medium, and program instructions stored on the non-transitory computer readable medium. The program instructions are executable by the at least one processor to perform functions including receiving a request to add automated streaming audio content to a particular playback position in a playback queue. The playback queue indicates a plurality of audio content and a corresponding playback position associated with each of the plurality of audio content. The functions further involve determining a playback duration for the automated streaming audio content, adding the automated streaming audio content to the playback queue at the particular playback position, and causing the automated streaming audio content to be rendered at the particular playback position in the playback queue for the determined playback duration.

In yet another aspect, a non-transitory computer readable medium having instructions stored thereon for adding and rendering automated streaming audio content in a playback queue is provided. The instructions are executable by a computing device to cause the computing device to perform functions including receiving a request to add automated streaming audio content to a particular playback position in a playback queue. The playback queue indicates a plurality of audio content and a corresponding playback position associated with each of the plurality of audio content. The functions further involve determining a playback duration for the automated streaming audio content, adding the automated streaming audio content to the playback queue at the particular playback position, and causing the automated streaming audio content to be rendered at the particular playback position in the playback queue for the determined playback duration.

II. Example Operating Environment

Referring now to the drawings, in which like numerals can refer to like parts throughout the figures, FIG. 1 shows an example system configuration 100 in which one or more embodiments disclosed herein can be practiced or implemented.

By way of illustration, the system configuration 100 represents a home with multiple zones, though the home could have been configured with only one zone. Each zone, for example, may represent a different room or space, such as an office, bathroom, bedroom, kitchen, dining room, family room, home theater room, utility or laundry room, and patio. A single zone might also include multiple rooms or spaces if so configured. One or more of zone players 102-124 are shown in each respective zone. A zone player 102-124, also referred to as a playback device, multimedia unit, speaker, player, and so on, provides audio, video, and/or audiovisual output. A controller 130 (e.g., shown in the kitchen for purposes of illustration) provides control to the system configuration 100. Controller 130 may be fixed to a zone, or alternatively, mobile such that it can be moved about the zones. The system configuration 100 may also include more than one controller 130. The system configuration 100 illustrates an example whole house audio system, though it is understood that the technology described herein is not limited to its particular place of application or to an expansive system like a whole house audio system 100 of FIG. 1.

a. Example Zone Players

Figure 2A:
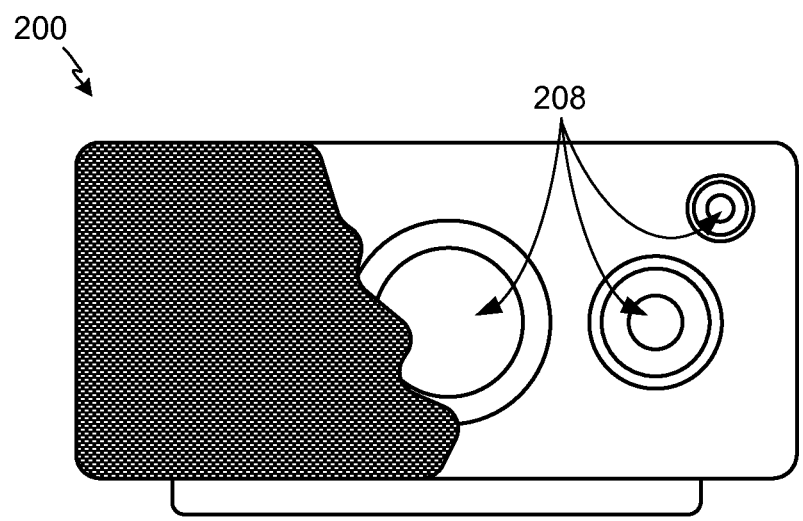
FIG. 2A shows an illustration of an example zone player having a built-in amplifier and transducers.
Figure 2B:
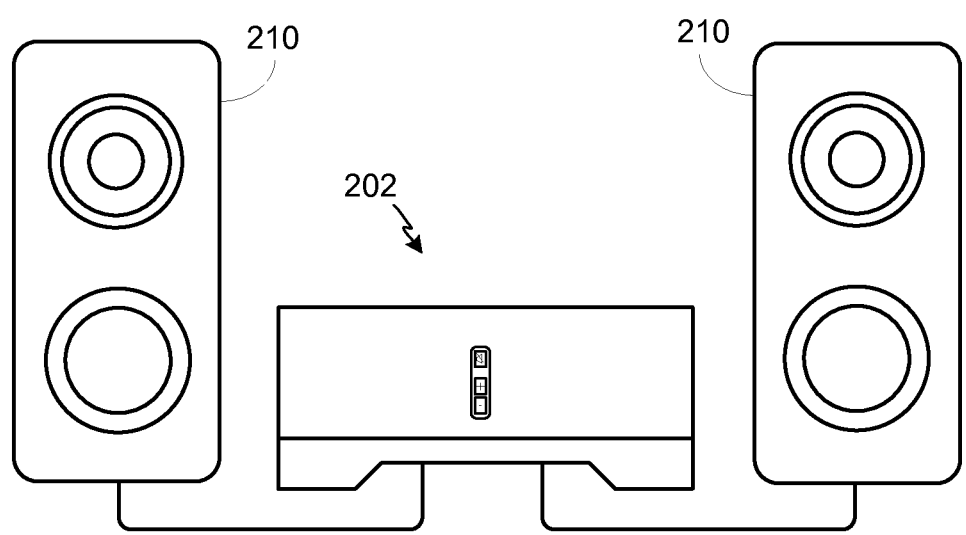
FIG. 2B shows an illustration of an example zone player having a built-in amplifier and connected to external speakers.
Figure 2C:
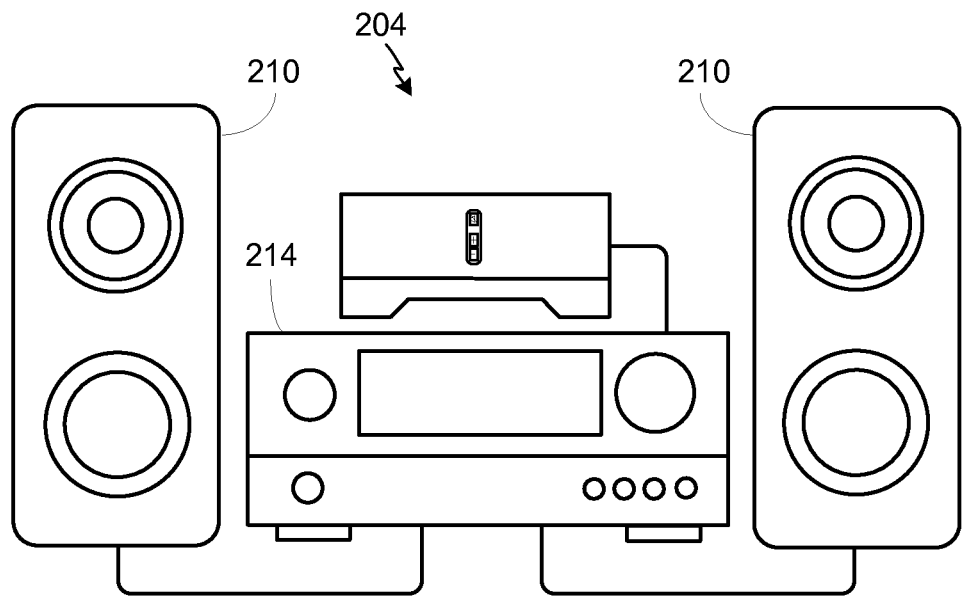
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single one player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
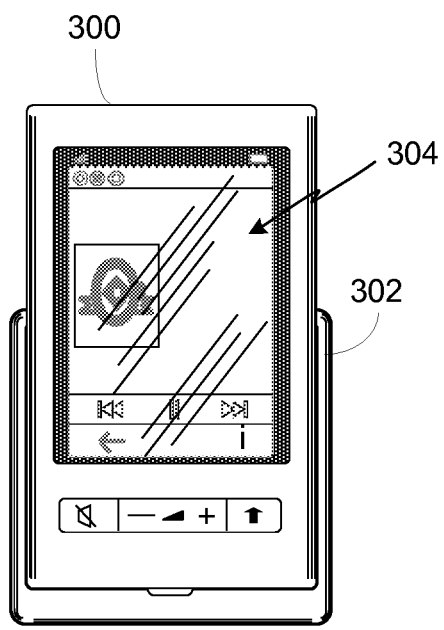
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone, or any other smart phone or network-enabled device can be used as controller 130. An application running on a laptop or desktop personal computer (PC) or MAC™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™" "SONOS® Controller for IPAD™" "SONOS® Controller for ANDROID™," "SONOS® Controller for MAC™ or PC.

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
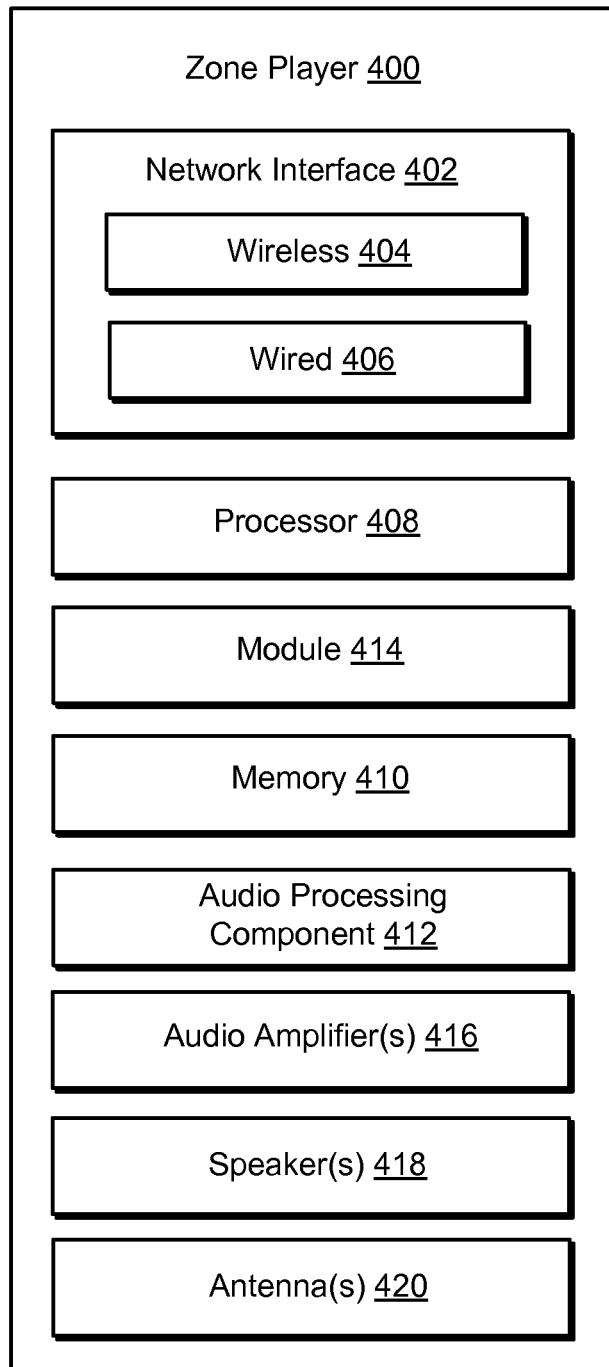
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP) based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
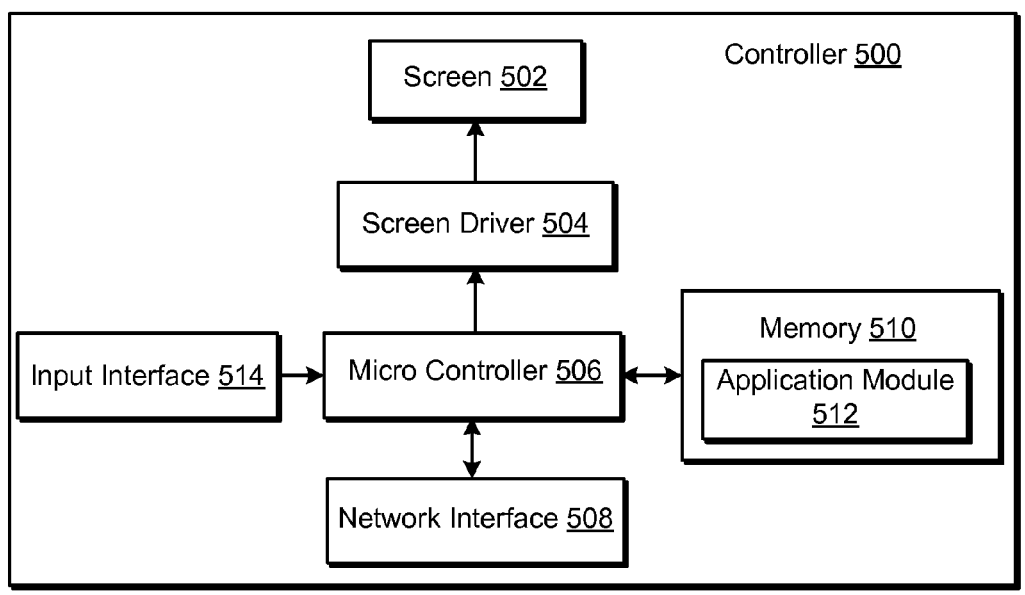
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®, IPAD® or any other smart phone or network-enabled device (e.g., a networked computer such as a PC or MAC®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
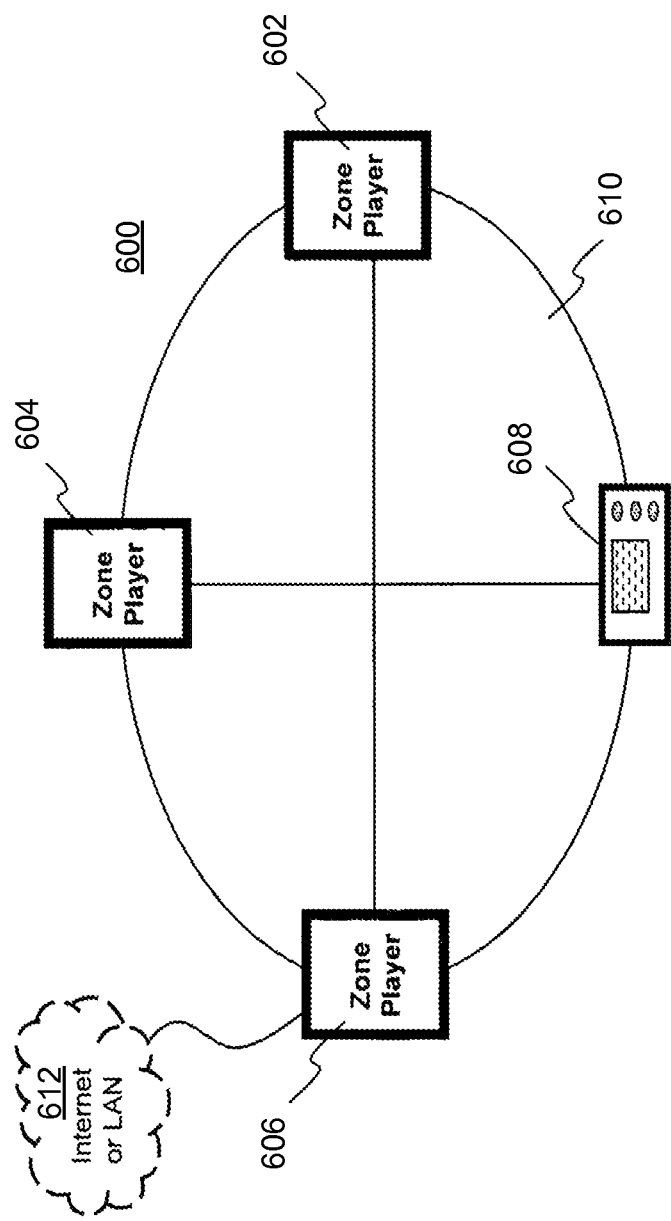
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may join and/or leave from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., the Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example System Configuration

Figure 7:
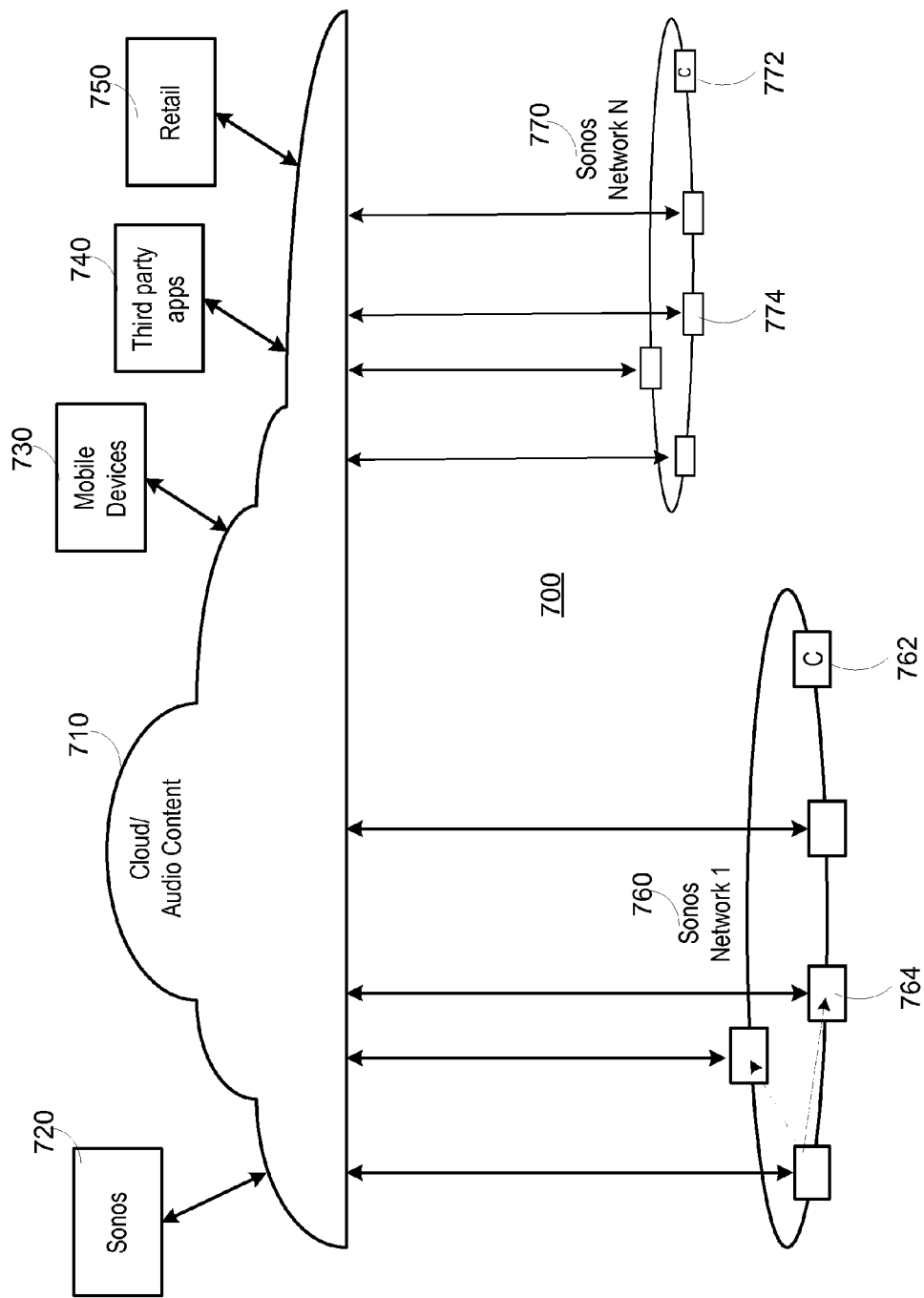
FIG. 7 shows a system including a plurality of networks including a cloud-based network and at least one local playback network.

FIG. 7 shows a system including a plurality of networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia playback system 720 (e.g., Sonos™), a mobile device 730, a third party application 740, a content provider 750 and so on can provide multimedia content (requested or otherwise) to local playback networks 760, 770. Within each local playback network 760, 770, a controller 762, 772 and a playback device 764, 774 can be used to playback audio content.

VII. Example Method for Audio Content Playback Management

As mentioned previously, a user may create a playlist that includes a variety of audio content from a number of different audio sources. In one example, the playlist may already include audio content, such as individual tracks or albums from a local music library (e.g., ITUNES™ library) and/or an online music library (e.g., via SPOTIFY™, RHAPSODY™, cloud storage, etc). As suggested above, the user may also wish to add to the playlist, automated streaming audio content, such as PANDORA™ radio channels or NPR, for example. As such, an embodiment is provided for adding audio content, including automated streaming audio content to a playlist.

Figure 8A:
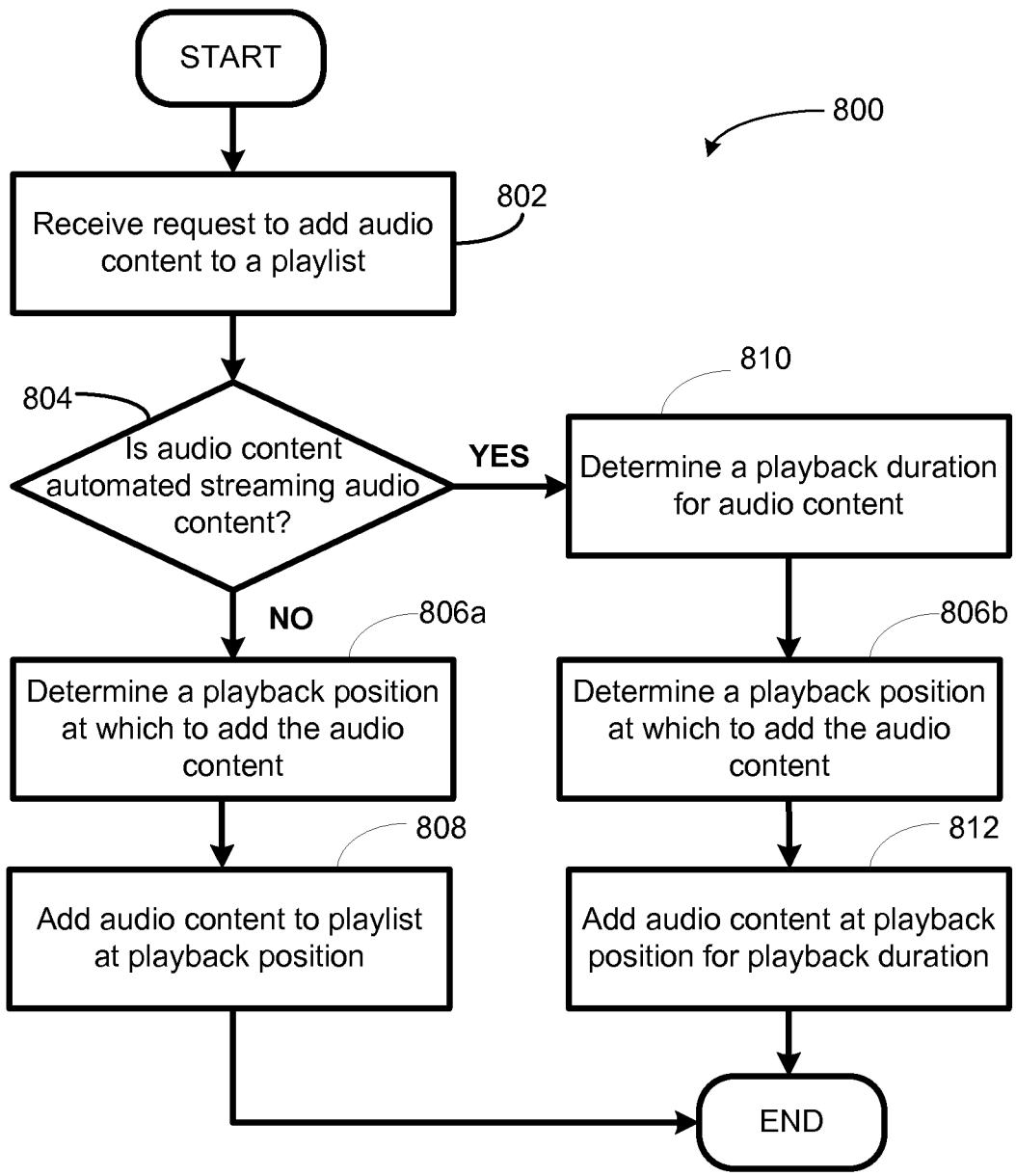
FIG. 8A shows an example block diagram for adding automated streaming audio content to a playback queue.

FIG. 8A shows an illustrative flow-chart for an example method 800 for adding audio content, including automated streaming audio content, to a playback queue, in accordance with at least some embodiments described herein. Method 800 shown in FIG. 8A presents an embodiment of a method that could be used in the environment 100 with the systems 200, 202, 204, 300, 400, and 500 for example, in communication with a device, such as devices illustrated in FIGS. 2-5. Method 800 may include one or more operations, functions, or actions as illustrated by one or more of blocks 802-812. As illustrated, blocks 802, 806a, 806b, 808, 810, and 812 are action blocks, and block 804 is a decision block. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8A may represent circuitry that is wired to perform the specific logical functions in the process.

At block 802, the method 800 involves receiving a request to add audio content to a playlist. As indicated above, the audio content to be added may be user-specified audio content or automated streaming audio content. The playlist may indicate a plurality of audio content and a corresponding playback position associated with each of the plurality of audio content. In one example, the request to add automated streaming audio content may be received from a user via a user-interface, such as the input interface 514 of the controller 500 in FIG. 5. In one case, a user may select an audio content via the user-interface, and subsequently request an addition of the selected audio content to the playlist.

At block 804, the method 800 may involve a determination of whether the audio content selected for addition to the playlist is an automated streaming audio content. As discussed previously, some audio content may have an implicit duration, such as a track length, while some other audio content, such as automated streaming audio content, may be rendered indefinitely unless explicitly stopped. Accordingly, whether an audio content has an implicit duration or not, as indicated by whether the audio content is an automated streaming audio content, may be considered when adding the audio content to a playlist.

If a determination is made at block 804 that the audio content to be added to the playlist is not an automated streaming audio content, and accordingly may have an implicit duration, then the method 800 may proceed to block 806a, where method 800 may involve determining a playback position at which to add the audio content. Generally speaking, the playback position may be defined as an order in the playlist at which the audio content may be rendered. In one example, the user may not have explicitly indicated a particular playback position when requesting to add the audio content to the playlist. For instance, the user may request the addition of the automated streaming audio content by simply selecting the audio content via the user-interface. In this case, the audio content may be added at the end of the current playlist by default. In another case, the audio content may be added to a location in the current playlist that is selected at random. In yet another case, the user may be prompted to indicate the particular playback position.

In another example, the user may specify the particular playback position when adding the audio content. For instance, with a graphic user-interface with a pointing device (such as, for example, a user's finger, a stylus, a mouse-driven pointer, and so on), a user may select an audio content from a visual representation of a list of available audio content, drag the selection to a visual representation of a playlist, and drop the selection at a particular position in the visual representation.

Once a playback position at which to add the audio content has been determined at block 806a, the method 800 may proceed to block 808 to add the audio content to the playlist at the playback position. In this case, the added audio content may then be rendered when the progression of audio rendering progresses to the playback position of the added audio content.

If a determination is made at block 804 that the audio content to be added to the playlist is an automated streaming audio content, and may not have an implicit duration, then the method 800 may proceed to block 810, where method 800 may involve determining a playback duration for the audio content to be added. In one example, the playback duration of the automated streaming audio content may be a default playback duration, such as 30 minutes, for example. In another example, determining a playback duration of the automated streaming audio content may involve receiving an indication of a playback duration of the automated streaming audio content from the user. For instance, when requesting an addition of automated streaming audio content to a playlist, the user may be prompted to indicate a playback duration for the automated streaming audio content.

As discussed previously, the automated streaming audio content may be a discrete automated streaming audio content, which may include an automatically compiled series of one or more discrete audio contents. In this case, the playback duration may indicate a number of discrete audio contents, such as five songs, rather than a timed duration. In one example, the number of discrete audio contents may be a default number. In another example, the user may be prompted to indicate a number of discrete audio contents when requesting to add the discrete automated streaming content to the playlist.

Once a playback duration for the automated streaming audio content to be added has been determined, the method 800 may then proceed to block 806b, which may involve determining a playback position at which to add the audio content. Similar to block 806a, the playback position may be determined, for example, based on user input, according to a default position (such as the end of the current playlist), or according to some pre-defined algorithm (such as randomly placed in the current play list).

As discussed previously, the automated streaming audio content may be a continuous automated streaming audio content, which may include live radio content. In one case, the user may wish to simply tune-in to the live radio at some point in the playlist, and may therefore request to add the continuous automated streaming audio content to the playlist at a playback position as defined by an order in the playlist. In another case, the user may wish to tune-in to a specific live program which may start and end at specific times. In this case, determining a playback position at which to add the audio content may involve determining the start and end times of the live program. In one instance, the user may be prompted to indicate the specific start and end times of the live program. In another instance, the specific start and end times may be looked up based on a title of the live program selected by the user for addition to the playlist.

At block 812, the method 800, involves adding the automated streaming audio content to the playlist at the particular playback position, and causing the automated streaming audio content to be rendered at the particular playback position in the playlist for the determined playback duration. In the case the audio content to be added is discrete automated streaming audio content, the audio content may be added at the determined playback position, and the added audio content may be rendered when the progression of audio rendering progresses to the playback position of the added audio content. This may also be the case for continuous automated streaming audio content if the user wishes to simply tune-in to a radio station at some point in the playlist.

On the other hand, if the user wishes to tune-in to a specific live program having a specific start and end time, the audio content may be added at a playback position defined by a specific time frame. In other words, the live program may be rendered during the specific time frame regardless of what position the playback progression of other audio content in the playlist is at. This, of course, may only be the case if the particular playlist is actually being played back at the specific time frame.

As discussed above, some audio content may have an implicit duration, while some audio content, such as the automated streaming audio content discussed herein, do not. As such, rendition of the automated streaming audio content in a playlist may not simply be rendering the audio content starting at the determined playback position, and rendering the audio content until completion. Depending on the type of automated streaming audio content, different audio content rendering configurations may be implemented, as discussed in the following example embodiments and illustrative examples.

a. Illustrative Example for Managing Discrete Automated Streaming Audio Content in a Playback Queue As previously discussed, the automated streaming audio content may be discrete automated streaming audio content. This may be streaming audio content such as that provided by PANDORA™, in which in individual, or "discrete" audio content may be selected and provided automatically according to artist, genre, or individual preferences etc. In this case, a user may add the discrete automated streaming audio content to the playlist at a playback position such that the discrete automated streaming audio content is rendered at the playback position. As suggested above, the user may also indicate a playback duration for the discrete automated streaming audio content. Because the discrete automated streaming audio content includes discrete audio content, the playback duration may be represented as a number of discrete audio content and/or a time duration, as previously discussed.

Figure 9A:
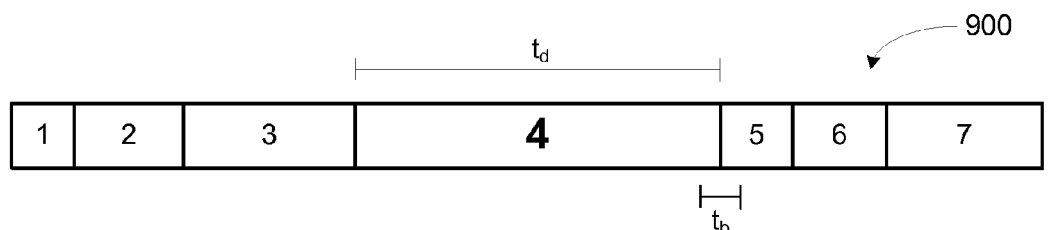
FIG. 9A shows an example playback queue with a discrete automated streaming audio content.
Figure 9B:
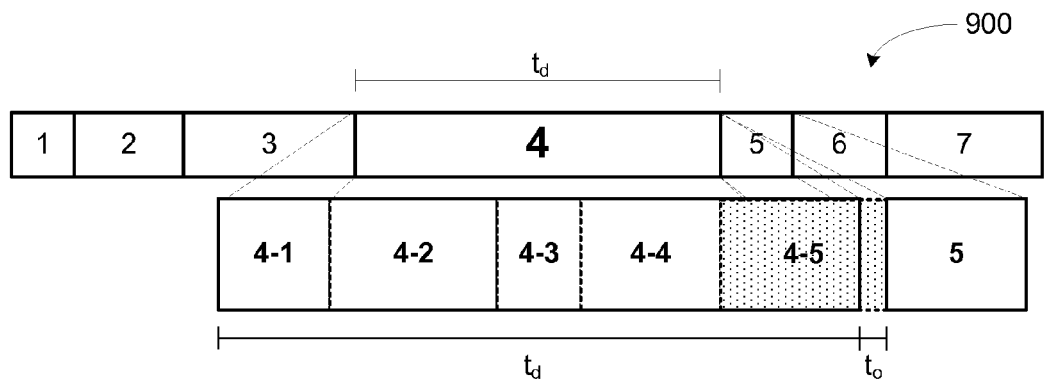
FIG. 9B shows an example playback queue when rendering the discrete automated streaming audio content.

FIGS. 9A and 9B show an example playlist 900 with a discrete automated streaming audio content in a fourth position of the playlist 900. As shown in FIG. 9A, the discrete automated streaming audio content may have a playback duration of $t_d$. In another example, as shown in FIG. 9B, the user may have added to the playlist 900 an allotment for five songs from a "Mumford & Sons Radio" channel on Pandora, for example, at the fourth playback position. In this case, the user may have indicated a playback duration of five songs for the playback of the "Mumford & Sons Radio" channel. As such, the fourth playback position may include five songs, represented as 4-1 to 4-5 from the "Mumford & Sons Radio" channel. Upon completed rendition of five songs from Mumford & Sons Radio on PANDORA™, audio content in a fifth playback position in the playlist may be rendered. In the case playback is set to repeat mode, the fourth playback position will include five songs from the Mumford & Sons Radio channel each time around. Since the five songs are determined by PANDORA™, the five songs rendered at the fourth playback position may vary each time around.

In another example, the user may add to the playlist an allotment of 30 minutes for a "Classic Rock" channel on PANDORA™ at the fourth playback position. In one case, the fourth playback position may play exactly 30 minutes of the Classic Rock channel, and cut straight to the audio content in the fifth playback position once the 30 minutes is up.

Figure 8B:
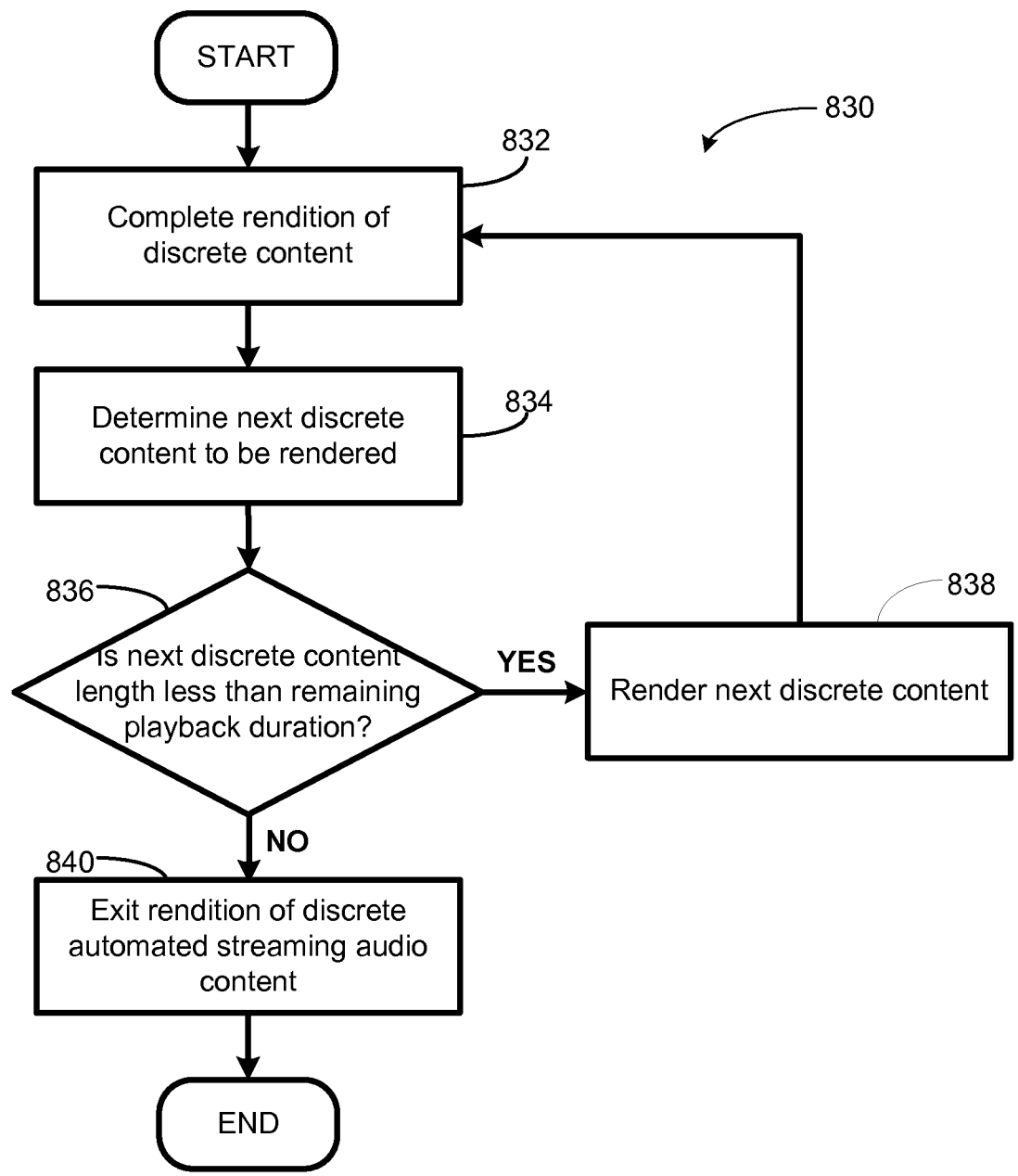
FIG. 8B shows a first example block diagram for rendering automated streaming audio content in a playback queue.

For a more seamless rendering of audio content, an alternative case may involve an "approximately 30 minute" playback of the Classic Rock channel. FIG. 8B shows a first example block diagram of a method 830 for rendering automated streaming audio content in a playback queue, in accordance with at least some embodiments described herein. Method 830 shown in FIG. 8 presents an embodiment of a method that could be used in the environment 100 with the systems 200, 202, 204, 300, 400, and 500 for example, in communication with a device, such as devices illustrated in FIGS. 2-5. Method 830 may include one or more operations, functions, or actions as illustrated by one or more of blocks 832-840. As illustrated, blocks 832, 834, 838, and 840 are action blocks, and block 836 is a decision block. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 832, the method 830 may involve completing a rendition of discrete content, such as discrete content provided by the Classic Rock channel. In one example, the discrete content for which rendition is completed may be the discrete content 4-4 of the playlist 900 of FIG. 9B. Upon complete rendition of discrete content 4-4, block 834 of the method 830 may involve determining a next discrete content to be rendered. In this case, as shown, the next discrete content may be discrete content 4-5.

At block 836, the method 830 may involve a determination as to whether the next discrete content has a duration less than the remaining time in the playback duration of the discrete automated streaming audio content. As discussed above, each of the discrete audio content in the discrete automated streaming audio content may have respective implicit durations. In this case, if the next discrete content has an implicit duration less than the remaining time in the playback duration of automated streaming audio content, the method 830 may proceed to block 838 of rendering the next discrete content.

In one example, if four minutes are left in the allotted duration td of 30 minutes, for example, and the next discrete content 4-5 has an implicit duration less than four minutes, then the next discrete content 4-5 may be rendered. However, if the implicit duration of discrete content 4-5 is longer than four minutes long, then playback of the discrete automated streaming audio content may be terminated at block 840 of the method 830. In other words, the "approximately 30 minutes" playback of the Classic Rock channel may be implemented as "no more than 30 minutes" in this case.

Similarly, the playback of the Classic Rock channel may also be implemented as "at least 30 minutes" such that discrete audio content provided by the Classic Rock channel is rendered until no time remains in the allotted 30 minutes. In other words, as long there is time left in the allotted duration $t_d$ of 30 minutes upon completed rendition of a discrete content, the next discrete audio content will be rendered. In this case, for a smooth transition, the next discrete audio content may be completely rendered, even if that would result in an overall playback duration of the discrete automated streaming audio content greater than the determined duration td of 30 minutes. In FIG. 9B, the overall playback duration may be shown as $t_d + t_0$.

In a further case, a flexible time range may be implemented such that a marginal amount of additional time may be available on top of the 30 minutes. For example, an additional two minutes may be available, such that if four minutes remain in the allotted 30 minutes, and the next discrete audio content is less than six minutes, the next discrete audio content may be rendered.

As shown in FIGS. 9A and 9B, the discrete automated streaming audio content at the fourth position in the playlist 900 is followed by audio content at the fifth position. In this case, upon termination of the rendering of the discrete automated streaming audio content after a duration of $t_d$, or approximately $t_d$, the playlist may proceed to the fifth position and the audio content in the fifth position may be rendered.

In another case, if the discrete automated streaming audio content is at a last position in the playlist (and the playback of the playlist is not in "repeat" mode), the discrete automated streaming audio content may be configured to continue playing, by rendering the next discrete content. In this case, a request to add subsequent audio content to the playlist may terminate the rendering of the discrete automated streaming audio content. In one instance, playback of the discrete automated streaming audio content may be instantly terminated, and the added subsequent audio content may be rendered immediately. In another instance, the rendition of the presently rendered discrete content of the discrete automated streaming audio content may completed before the rendition of the added subsequent audio content. In yet another instance, the user may be prompted as to whether the added subsequent audio content is to be immediately rendered or rendered after complete rendition of the presently rendered discrete content.

b. Illustrative Example for Managing Continuous Automated Streaming Audio Content in a Playback Queue As previously discussed, the automated streaming audio content may be continuous automated streaming audio content. This may be live radio broadcasts such as that provided by NPR or a Top 40 radio station, which includes a continuous automated stream of audio content. Similar to the case of adding discrete automated streaming audio content to the playlist as discussed above, the user may indicate a playback position and a playback duration of the continuous stream of audio content. In some cases, the user may wish to simply tune-in to a radio station at some point in the playlist. For example, the user may add NPR to a third position in a playlist for a playback duration of one hour. Accordingly, upon completed rendition of audio content in the second position in the playlist, NPR may be rendered for one hour.

In another case, as previously discussed, the user may wish to enjoy a specific live radio broadcast program, such as "Fresh Air" on NPR. In this case, the playback position may represent a specific time rather than a specific position in the queue of audio content. For instance, if the user adds a live broadcast program which begins at 3:00 pm for a duration of one hour, then the continuous automated streaming audio content may be rendered beginning at 3:00 pm and ending at 4:00 pm.

Figure 10A:
FIG. 10A shows an example playback queue with a continuous automated streaming audio content.

FIG. 10A shows an example playlist 1000 with a continuous automated streaming audio content having a playback position of time $t_s$ to time $t_e$. Continuing with the example above, $t_s$ may be 3:00 pm and $t_e$ may be 4:00 pm. In this case, because the playback position of the continuous automated streaming audio content is based on a start and end time as opposed to an order in the playlist 1000, the representation of the continuous automated streaming audio content in the playlist may just be a duration block without an explicit order. In FIG. 10A, the continuous automated streaming audio content is tacked on at the end of the playlist for illustration purposes. Note that this representation does not necessarily indicate that the continuous automated streaming audio content is at the last position in the playlist.

Figure 10B:
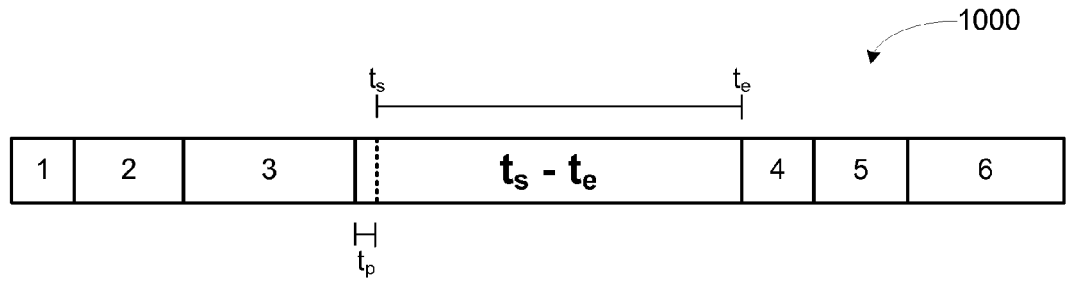
FIG. 10B shows an example playback queue when rendering the continuous automated streaming audio content.

FIG. 10B shows the example playlist 1000 when rendering the continuous automated streaming audio content. When the playlist 1000 is being played, a playback position of the continuous automated streaming audio content, in relation to the other audio content in the playlist may be determined based on the specified start and end times of the continuous automated streaming audio content. As shown in FIG. 10B, a determination may be made that the continuous automated streaming audio content to be rendered from time $t_s$ to time $t_e$ will be rendered at a provisional position after the third audio content in the playlist. This may be determined based on the durations of the first, second, third, and fourth audio content in the playlist, and a remaining time between a present time and the time $t_s$.

In one case, the determination of the provisional position may be made when the playlist first begins to be rendered. In another case, the determination may be made at each completed rendition of an audio content in the playlist. In either case, if a modification to the playlist, such as an addition, deletion, or playback position modification is made to any audio content in the playlist, the provisional position of the continuous automated streaming audio content may be adjusted accordingly. For example, if the user requests that the second audio content is skipped during playback of the playlist, the provisional position of the continuous automated streaming audio content may accordingly be changed to a position after the fourth audio content from the position after the third audio content.

In one case, the playlist may cut to the continuous streaming audio content at 3:00 pm regardless of the playback status of a presently rendered audio content, and resume rendering of the presently rendered audio content at 4:00 pm. In this case, transitions between the rendition of the continuous automated streaming audio content and other audio content in the playlist may be abrupt. As such, a method 860 may be provided for a more seamless transition between the continuous automated streaming audio content and other audio content in the playlist.

Figure 8C:
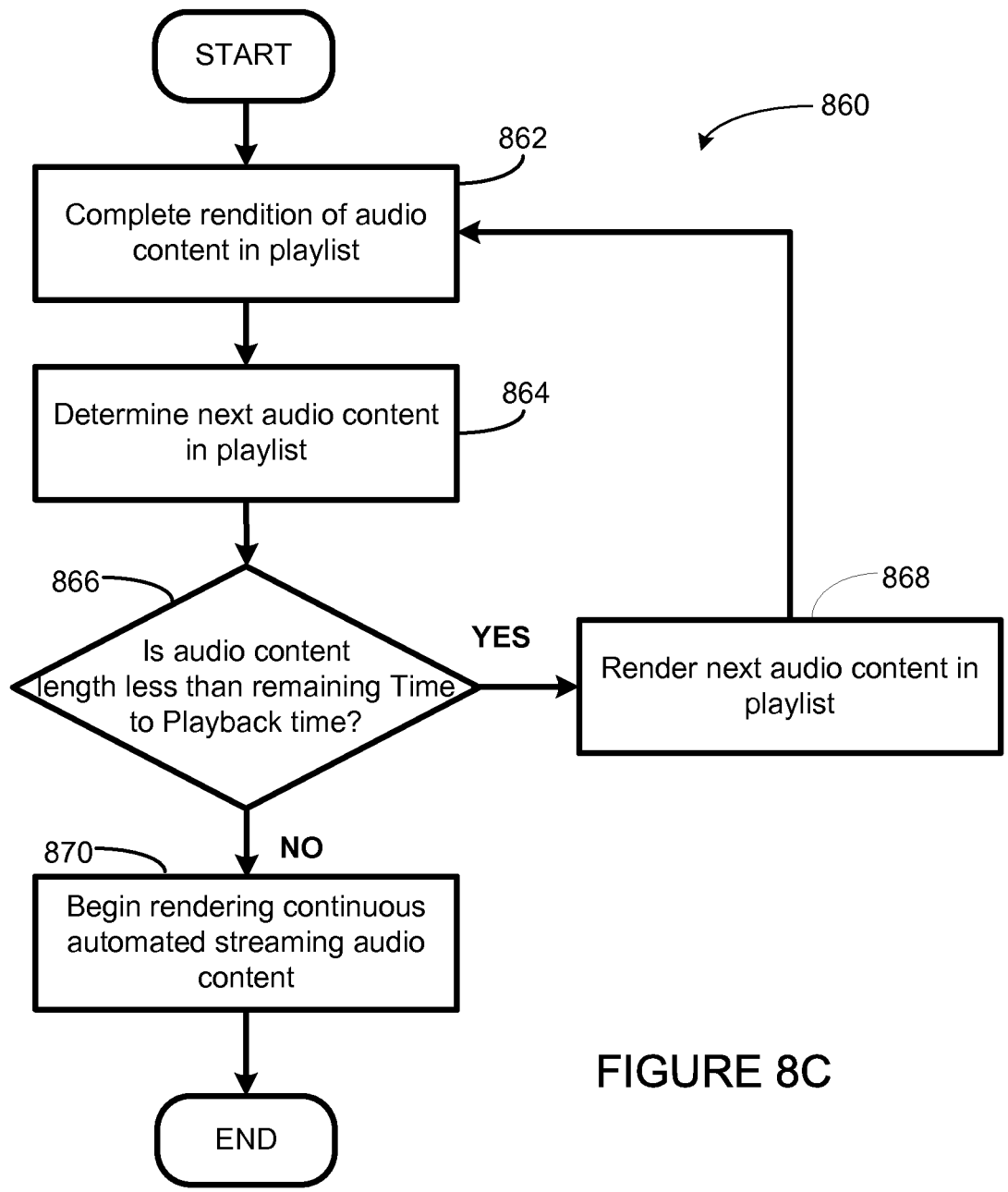
FIG. 8C shows a second example block diagram for rendering automated streaming audio content in a playback queue.

FIG. 8C shows a first example block diagram of a method 860 for rendering automated streaming audio content in a playback queue, in accordance with at least some embodiments described herein. Method 860 shown in FIG. 8C presents an embodiment of a method that could be used in the environment 100 with the systems 200, 202, 204, 300, 400, and 500 for example, in communication with a device, such as devices illustrated in FIGS. 2-5. Method 860 may include one or more operations, functions, or actions as illustrated by one or more of blocks 862-870. As illustrated, blocks 862, 864, 868, and 870 are action blocks, and block 866 is a decision block. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 862, the method 860 may involve completing rendition of audio content in the playlist, similar to block 834 of FIG. 8B, and at block 864, the method 860 may involve determining a next audio content to be rendered, similar to block 836 of FIG. 8B. Referring to FIG. 10B, the audio content in the fourth position may be determined as the next audio content upon complete rendition of the audio content in the third position.

At block 866, the method 860 may involve making a determination as to whether a duration of the next audio content is less than the remaining time until the playback time L. In the case discussed above, as 3:00 pm approaches and upon completed rendition of the third audio content in the playlist, a determination may be made as to whether the fourth audio content in the playlist should be rendered based on an amount of remaining time until 3:00 pm, and a duration of the fourth audio content. For instance, if it is 2:55 pm and the fourth audio content in the playlist is less than five minutes, then the next audio content may be rendered at block 868. However, if the fourth audio content in the playlist is longer than five minutes long, then the rendition of next audio content in the playlist may be postponed until 4:00 pm, and the continuous automated streaming audio content may be subsequently rendered at block 870. In one case, silence, white noise, or a pre-defined instrumental track (stored locally or remotely), for example, may be provided between a time 2:55 pm and 3:00 pm when the live broadcast program begins. The time between when rendition of the previous audio content is complete and the start time of the continuous automated streaming audio content is represented in FIG. 10B as $t_p$. In another case, rendition of the continuous automated streaming audio content may begin at 2:55 pm. In this case, the continuous automated streaming audio content may be still be rendered until 4:00 pm, the end time $t_e$ of the live program, such that the entire live broadcast program is provided.

Similar to the case of discrete automated streaming audio content discussed previously, a flexible time range may be implemented such that a marginal amount of the live broadcast program may be buffered. For example, two minutes of buffering may be available, such that if it is 2:55 pm, and the next audio content in the playlist is seven minutes long, then the next audio content may be rendered while the first two minutes of the live broadcast program may be buffered for rendition beginning at 3:02 pm, upon completed rendition of the next audio content in the playlist. In this case, the continuous automated streaming audio content may be rendered for the full one hour until 4:02 pm such that the entire live broadcast program may be provided.

Also similar to the case of discrete automated streaming audio content discussed previously, if the continuous automated streaming audio content is at a last position in the playlist (and the playback of the playlist is not in "repeat" mode), the continuous automated streaming audio content may be configured to continue playing. Likewise in this case, a request to add subsequent audio content to the playlist may terminate the rendering of the continuous automated streaming audio content.

c. Playback Duration Adjustments for Automated Streaming Audio Content Playback In either case of rendering discrete or continuous automated streaming audio content, as described above, the user may be provided control access to adjust the playback duration of the automated streaming audio content in the playlist at any time, whether the automated streaming audio content is presently being rendered or not. In one example, a playback progress indicator may be provided on a user interface indicating a playback progress of the automated streaming audio content being rendered.

In one case, the user may adjust the playback duration of the automated streaming audio content by adjusting the slider on the progress bar. In one instance, if the user provides input indicating a forward adjustment of the playback progress of the automated streaming audio content by moving the slider forward, the result may be a reduction in the playback duration of the automated streaming audio content based on the received forward adjustment, rather than an advancement in the rendering progress of the automated streaming audio content. In another instance, if the user provides input indicating a backward adjustment of the playback progress of the automated streaming audio content by moving the slider backward, the result may be an increase in the playback duration of the automated streaming audio content based on the received forward adjustment, rather than a rewind in the rendering progress of the automated streaming audio content.

In one example, upon adjustment of the slider, a determination may be made as to whether the adjustment applies only to the present playback of the automated streaming audio content or to all future renditions of the automated streaming audio content in the playlist. This may be applicable to if the playlist is being rendered in repeat mode. In one case, a default setting may indicate that any playback duration adjustments are stored and applied to future renditions of the automated streaming audio content in the playlist. In another case, the default setting may indicate that playback duration adjustments are not stored and applied to future renditions of the automated streaming audio content in the playlist. In yet another case, the user may be prompted to indicate whether the playback duration adjustment is to be stored and applied to further renditions of the automated streaming audio content in the playlist.

d. Example User Interfaces for Displaying Playback Queues with Automated Streaming Audio Content To further illustrate an inclusion of automated streaming audio content in a playback queue, FIGS. 11A, 11B, and 12 are provided to show example user interfaces displaying example playback queues in accordance with some embodiments of the present application.

Figure 11A:
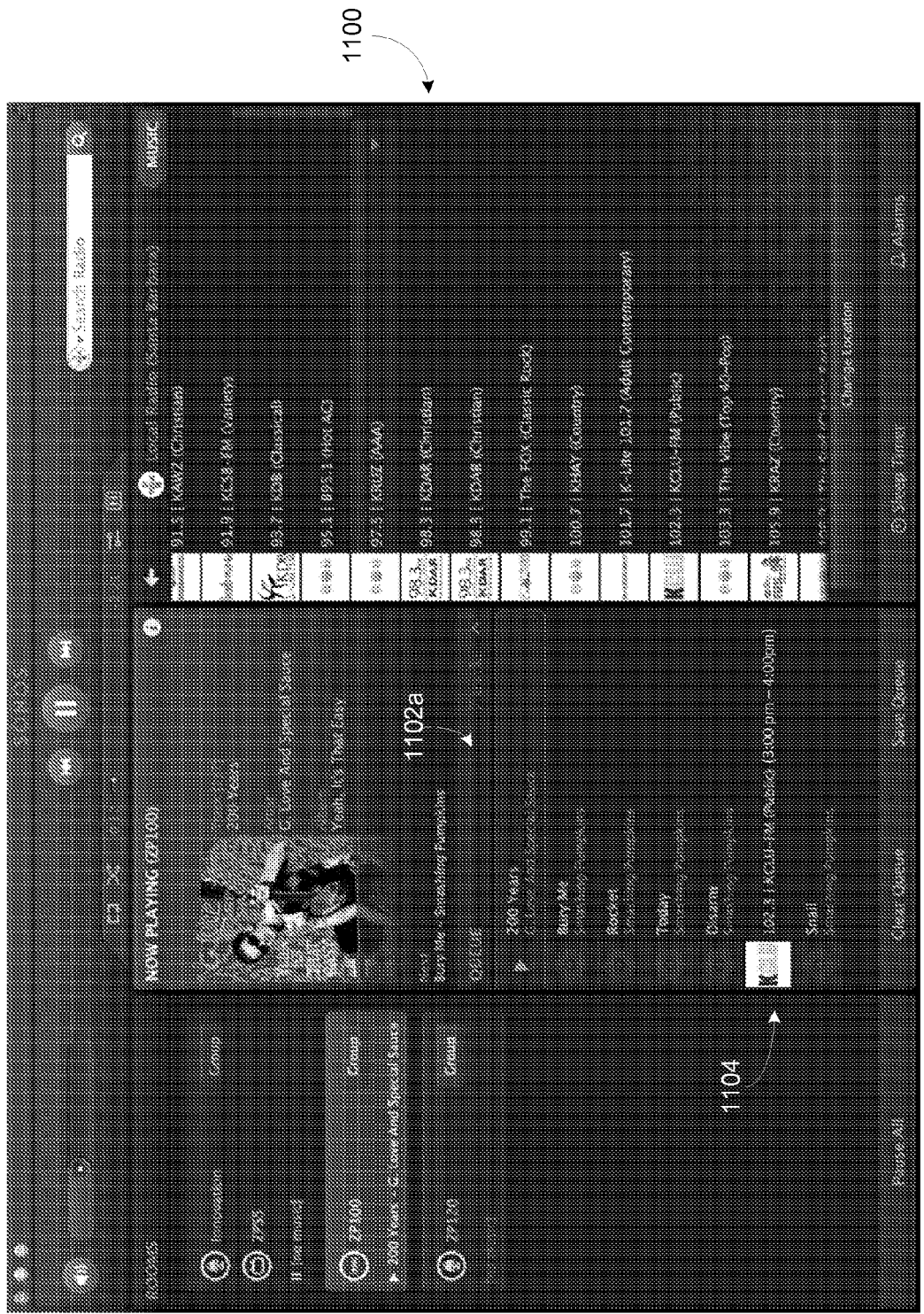
FIG. 11A shows a first example user interface displaying a first example playback queue with a continuous automated streaming audio content.
Figure 11B:
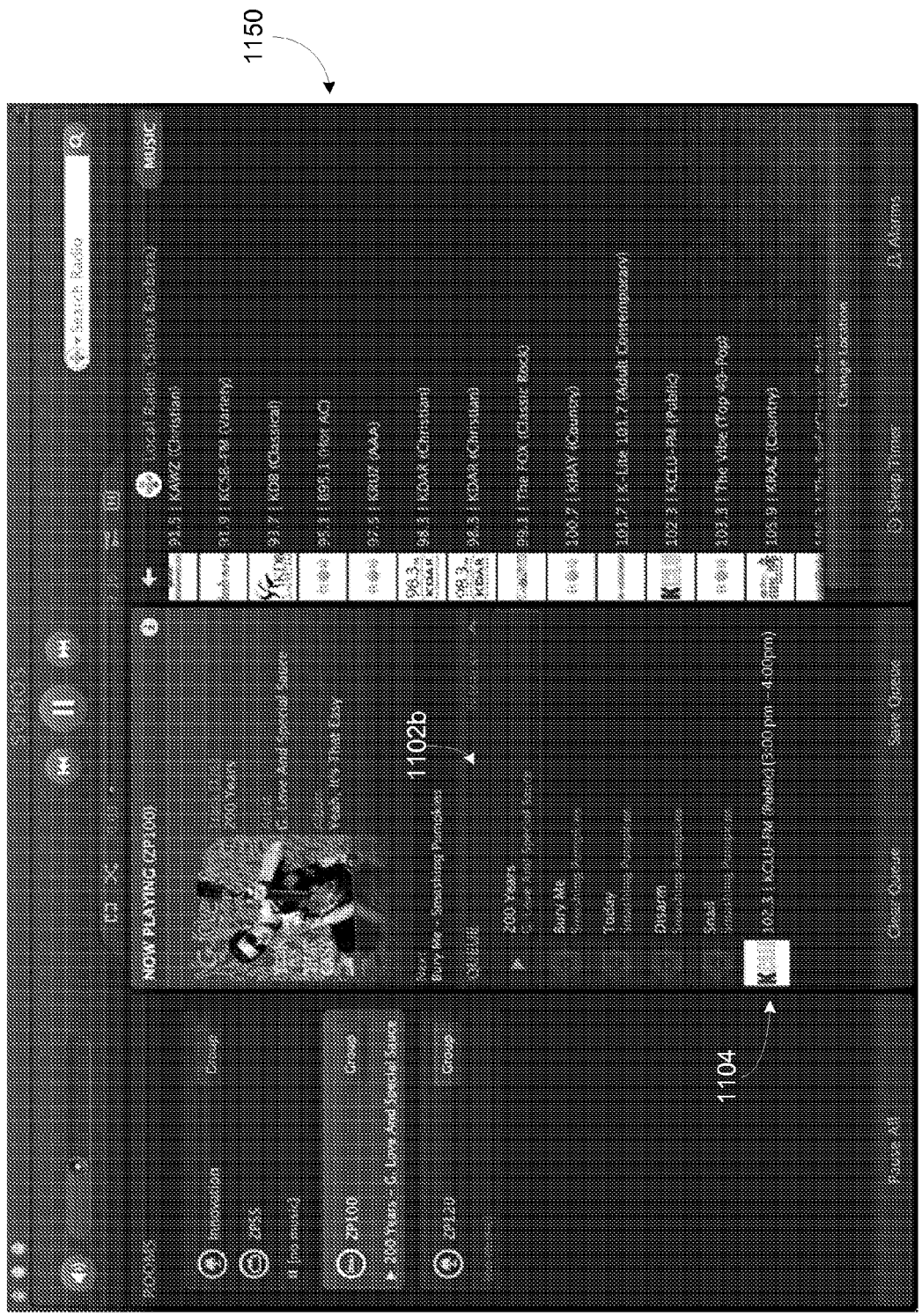
FIG. 11B shows the first example user interface displaying a second example playback queue with a continuous automated streaming audio content.
Figure 12:
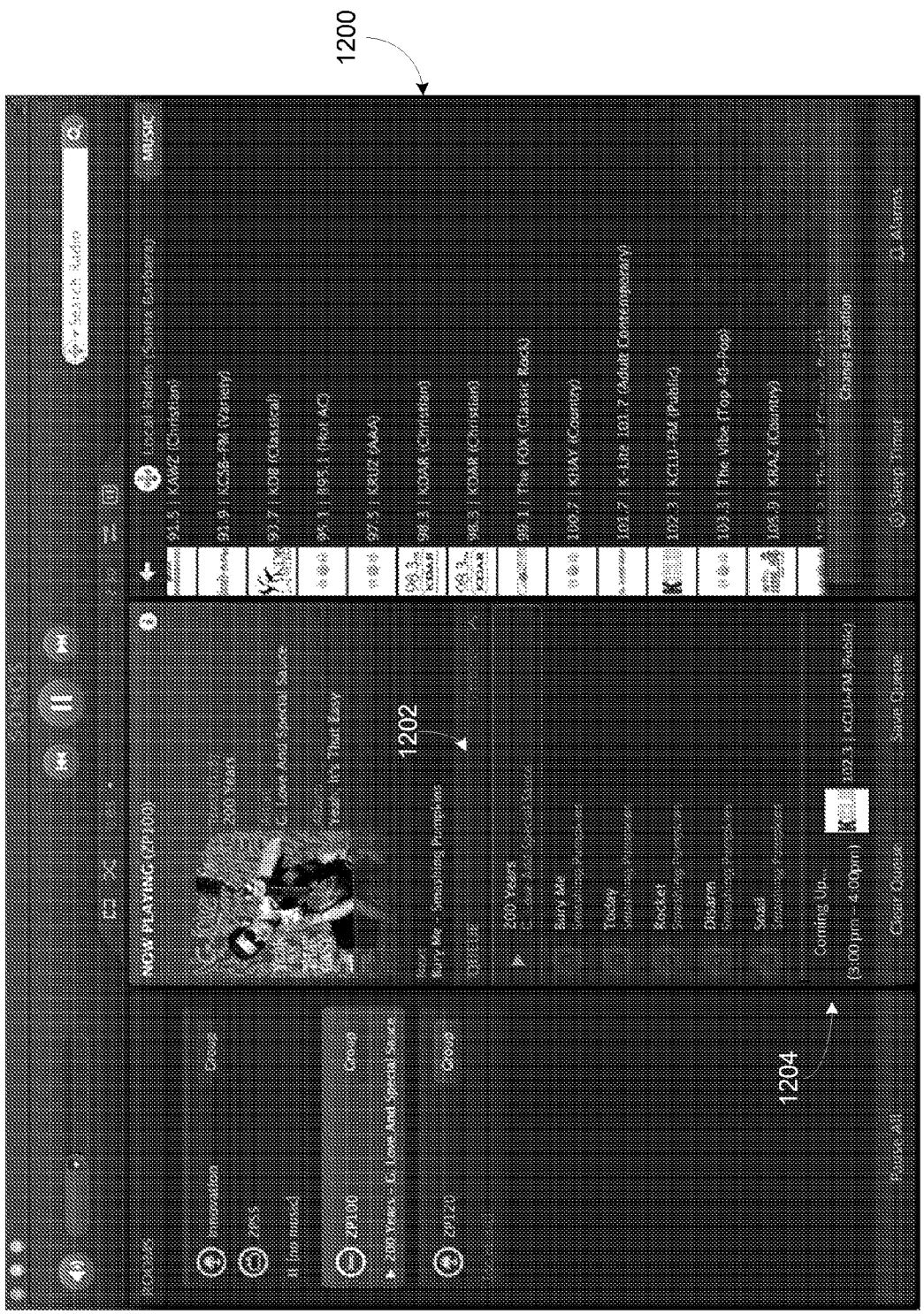
FIG. 12 shows a second example user interface displaying an example playback queue with a continuous automated streaming audio content.

FIG. 11A shows a first example user interface 1100 displaying a first example playback queue 1102a with an automated streaming audio content 1104. As shown, the playback queue 1102a may include seven tracks, and the automated streaming audio content 1104 may be scheduled to be rendered between the times 3:00 pm and 4:00 pm. In one example, a determination may be made that the first five tracks currently in the playback queue 1102a may be rendered between a present time and 3:00 pm. As shown, the automated streaming audio content 1104 may accordingly appear to be in the sixth position. As such, the example user interface 1100 may provide an indication of where in the playback queue the automated streaming audio content may be rendered, even though the automated streaming audio content may have been added to the queue according to a playback time rather than a playback position.

In one example, one of the tracks in the playback queue 1102a may be removed. For example, "Rocket" by the Smashing Pumpkins which is in the third playback position of the playback queue 1102a may be removed. Such a change may be reflected in playback queue 1102b of example user interface 1150 of FIG. 11B. As shown, "Rocket" was removed, and the resulting queue 1102b has six tracks instead of seven. In this case, since "Rocket" was previously in a position ahead of where the automated streaming audio content 1104 was expected to be rendered, the playback position of the automated streaming audio content 1104 within the queue may be adjusted (as opposed to simply advanced).

In one case, a determination may be made that "Snail" by the Smashing Pumpkins, previously expected to be rendered after the automated streaming audio content 1104, may now also be rendered before 3:00 pm as a result of "Rocket" being removed. As shown in FIG. 11B, the automated streaming audio content 1104, to be rendered at 3:00 pm may be in the sixth position of the playback queue 1102b.

In another case, a determination may be made that "Snail" may be an extremely long song (at least, longer than "Rocket"), and therefore cannot be rendered before 3:00 pm if rendered before the automated streaming audio content 1104. In this case, the automated streaming audio content 1104 may advance to the fifth playback position, and "Snail" may be rendered after the automated streaming audio content 1104 such that the automated streaming audio content 1104 may be rendered between 3:00 pm and 4:00 pm as requested when being added to the playback queue.

In another example, the appearance of an automated streaming audio content in a playback queue may not provide an explicit indication of an expected, relative playback position in the queue. FIG. 12 illustrates such a user interface 1200 with a playback queue 1202 may include an automated streaming audio content 1204. As shown, the automated streaming audio content 1204 may simply be provided at the bottom of the playback queue 1202. In this case, text indications "Coming up . . . " and "3:00 pm-4:00 pm" may be provided to indicate that rendering of the automated streaming audio content 1204 will occur at 3:00 pm. Other text indications, such as "Playing next . . . ," may also be provided for the appropriate scenarios.

VII. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As provided in the embodiments discussed above, a user may put together a playlist including a variety of audio content types. Specifically, as discussed, the user may include in a single playlist, specific audio content such as that from iTunes™ or SPOTIFY™, discrete automated streaming audio content such as that from PANDORA™, and continuous automated streaming audio content, such as that from NPR.

In one aspect, a method is provided. The method involves receiving a request to add automated streaming audio content to a particular playback position in a playback queue. The playback queue indicates a plurality of audio content and a corresponding playback position associated with each of the plurality of audio content. The method further involves determining a playback duration for the automated streaming audio content, adding the automated streaming audio content to the playback queue at the particular playback position, and causing the automated streaming audio content to be rendered at the particular playback position in the playback queue for the determined playback duration.

In another aspect, a system is provided. The system includes at least one processor, a non-transitory computer readable medium, and program instructions stored on the non-transitory computer readable medium. The program instructions are executable by the at least one processor to perform functions including receiving a request to add automated streaming audio content to a particular playback position in a playback queue. The playback queue indicates a plurality of audio content and a corresponding playback position associated with each of the plurality of audio content. The functions further involve determining a playback duration for the automated streaming audio content, adding the automated streaming audio content to the playback queue at the particular playback position, and causing the automated streaming audio content to be rendered at the particular playback position in the playback queue for the determined playback duration.

In yet another aspect, a non-transitory computer readable medium having instructions stored thereon is provided. The instructions are executable by a computing device to cause the computing device to perform functions including receiving a request to add automated streaming audio content to a particular playback position in a playback queue. The playback queue indicates a plurality of audio content and a corresponding playback position associated with each of the plurality of audio content. The functions further involve determining a playback duration for the automated streaming audio content, adding the automated streaming audio content to the playback queue at the particular playback position, and causing the automated streaming audio content to be rendered at the particular playback position in the playback queue for the determined playback duration.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A computing device comprising:
   a processor; and
   memory having stored thereon instructions executable by the processor to cause the computing device to perform functions comprising:
      receiving a request to add continuous automated streaming audio content to a playback queue, the request indicating a playback start time, and the playback queue indicating a plurality of audio content;
      adding the continuous automated streaming audio content to the playback queue, wherein the continuous automated streaming audio content is added in a playback position subsequent to a given audio content;
      before playing the given audio content in the playback queue, determining that a duration until the playback start time is less than a duration of the given audio content;
      responsively, playing the continuous automated streaming audio content; and
      after playing the continuous automated streaming audio content, playing the given audio content in the playback queue.

2. The computing device of claim 1, wherein the given audio content is a first given audio content, and wherein the functions further comprise:
   before playing the continuous automated streaming audio content in the playback queue, determining that a duration until the playback start time is greater than a duration of a second given audio content; and
   responsively, playing the second given audio content before playing the continuous automated streaming audio content.

3. The computing device of claim 1, wherein the functions further comprise:
   determining a playback end time of the continuous automated streaming audio content; and
   terminating playback of the continuous automated streaming audio content at the playback end time.

4. The computing device of claim 3, wherein the functions further comprise:
   playing the given audio content at the playback end time of the continuous automated streaming audio content.

5. The computing device of claim 1, wherein the functions further comprise:
   determining a playback duration of the continuous automated streaming audio content; and
   terminating playback of the continuous automated streaming audio content after playing the continuous automated streaming audio content for the playback duration.

6. The computing device of claim 1, wherein playing the continuous automated streaming audio content comprises:
   prior to the playback start time, determining that a duration of a second given audio content in the playback queue is less than the duration until the playback start time;
   responsively, playing the second given audio content; and
   at the playback start time, playing the continuous automated streaming audio content.

7. The computing device of claim 1, wherein the continuous automated streaming audio content comprises live audio content.

8. A method comprising:
   receiving, via a playback device, a request to add continuous automated streaming audio content to a playback queue, the request indicating a playback start time, and the playback queue indicating a plurality of audio content;
   adding, via the playback device, the continuous automated streaming audio content to the playback queue, wherein the continuous automated streaming audio content is added in a playback position subsequent to a given audio content;
   before playing the given audio content in the playback queue, determining, via the playback device, that a duration until playback start time is less than a duration of the given audio content;
   responsively, playing, via the playback device, the continuous automated streaming audio content; and
   after playing the continuous automated streaming audio content, playing the given audio content in the playback queue.

9. The method of claim 8, wherein the given audio content is a first given audio content, and wherein the method further comprises:
   before playing the continuous automated streaming audio content in the playback queue, determining, via the playback device, that a duration until the playback start time is greater than a duration of a second given audio content; and
   responsively, playing the second given audio content before playing the continuous automated streaming audio content.

10. The method of claim 8, further comprising:
    determining, via the playback device, a playback end time of the continuous automated streaming audio content; and
    terminating, via the playback device, playback of the continuous automated streaming audio content at the playback end time.

11. The method of claim 10, further comprising:
    playing, via the playback device, the given audio content at the playback end time.

12. The method of claim 8, further comprising:
    determining, via the playback device, a playback duration of the continuous automated streaming audio content; and
    terminating, via the playback device, playback of the continuous automated streaming audio content after playing the continuous automated streaming audio content for the playback duration.

13. The method of claim 8, wherein playing the continuous automated streaming audio content comprises:
    prior to the playback start time, determining, via the playback device, that a duration of a second given audio content in the playback queue is less than the duration until the playback start time;
    responsively, playing the second given audio content; and
    at the playback start time, playing, via the playback device, the continuous automated streaming audio content.

14. The method of claim 8, wherein the continuous automated streaming audio content comprises live audio content.

15. A non-transitory computer readable medium having stored thereon instructions executable by a computing device to perform functions comprising:
- receiving a request to add continuous automated streaming audio content to a playback queue, the request indicating a playback start time, and the playback queue indicating a plurality of audio content;
- adding the continuous automated streaming audio content to the playback queue, wherein the continuous automated streaming audio content is added in a playback position subsequent to a given audio content;
- before playing the given audio content in the playback queue, determining that a duration until the playback start time is less than a duration of the given audio content;
- responsively, playing the continuous automated streaming audio content; and
- after playing the continuous automated streaming audio content, playing the given audio content in the playback queue.

16. The non-transitory computer readable medium of claim 15, wherein the functions further comprise:
- before playing the continuous automated streaming audio content in the playback queue, determining that a duration until the playback start time is greater than a duration of a second given audio content; and
- responsively, playing the second given audio content before playing the continuous automated streaming audio content.

17. The non-transitory computer readable medium of claim 15, wherein the functions further comprise:
- determining a playback end time of the continuous automated streaming audio content; and
- terminating playback of the continuous automated streaming audio content at the playback end time.

18. The non-transitory computer readable medium of claim 17, wherein the functions further comprise:
- playing the given audio content at the playback end time.

19. The non-transitory computer readable medium of claim 15, wherein the functions further comprise:
- determining a playback duration of the continuous automated streaming audio content; and
- terminating playback of the continuous automated streaming audio content after playing the continuous automated streaming audio content for the playback duration.

20. The non-transitory computer readable medium of claim 15, wherein playing the continuous automated streaming audio content comprises:
- prior to the playback start time, determining that a duration of a second given audio content in the playback queue is less than the duration until the playback start time;
- responsively, playing the second given audio content; and
- at the playback start time, playing the continuous automated streaming audio content.

* * * * *